Patented Mar. 2, 1937

2,072,179

UNITED STATES PATENT OFFICE 2,072,179

MANUFACTURE OF STARCH-SIZED PAPERS

Oscar F. Neitzke, Belmont, Mass., assignor to Bennett Incorporated, Cambridge, Mass., a corporation of Massachusetts No Drawing. Application March 23, 1935, Serial No. 12,732

7 Claims. (Cl. 92—21)

This invention relates to the manufacture of papers whereinto starch enters as a sizing ingredient. While not limited thereto, it deals more particularly with starch-sized papers which are produced from papermaking stock or beater furnishes into which the starch has been incorporated as an aqueous composition either alone or along with precipitable sizes, such as rosin size and/or aqueous wax dispersions of the nature of aqueous mixtures of paraffin wax and rosin size, of paraffin wax and saponified Montan wax, of paraffin wax, rosin size, and saponified Montan wax, etc.

In producing starch-sized papers, it has heretofore been the practice to incorporate two general kinds of starch into the papermaking stock, for instance, while the stock is in the beater engine. Thus, raw starches, such as raw potato starch, and swollen or alkalinized starches have heretofore been employed for this purpose. The swollen or alkalinized starch is prepared by commingling the raw starch with an alkaline solution, such as a caustic soda solution, which transforms the suspension of starch granules to colloidal solution or gel by reason of the swelling or rupture of the starch granules.

In working with various amylaceous materials with a view toward improving the qualities of the papers into which they are incorporated as sizing agents, I have discovered that it is possible to derive surprising benefit from an amylaceous sizing agent if, prior to incorporation into the paper, it is subjected not only to the initial swelling action of an alkaline solution and thereby transformed to a gelatinous condition but is also brought to a substantially neutral state by the addition thereto of a suitable acidic reagent in amount calculated to react with the alkali associated therewith. This discovery may be applied when using various amylaceous substances in the sizing of paper, for instance, such starches as potato, corn, tapioca and sago. Especially surprising and valuable is my finding that starch which has undergone preliminary modification by alkalinization followed by neutralization imparts to paper an increased bursting or Mullen strength considerably greater than that realized when raw starch or alkalinized but non-neutralized starch is incorporated into paper; and this finding holds true even when very little starch is incorporated into the paper.

I shall now give a specific example of procedure for the production of starch-sized paper in accordance with the present invention. To a mixing tank may be added 5 parts by weight of raw potato starch and cold caustic soda solution prepared by dissolving 0.75 parts by weight of caustic soda in 5 parts by weight of water. These ingredients are mixed, in consequence of which the starch granules are swollen or burst to form a substantially transparent, thickly gelatinous solution. To such solution may be added gradually and with mixing 190 parts by weight of cold water, thereby forming a starch solution which, although of 2½% starch content, is fairly thick or viscous. The resulting diluted starch solution may then be neutralized with an aqueous solution of sulphuric acid consisting of 1 part by weight of sulphuric acid of 60° Beaumé dissolved in 10 parts by weight of water, which acid solution is precisely sufficient to effect a neutralization of the alkali content of the starch solution.

It is thus seen that according to the foregoing example, the starch is first swollen to form a starch solution of high solids content and is diluted before it undergoes neutralization. By swelling the starch at high concentration with a strong caustic soda solution, the desired swelling or rupture of the starch granules can readily be effected even in the cold. However, this leads to such a thick or viscous solution that acidic neutralizing agent cannot be distributed therethrough with the desired facility or uniformity. It is for this reason that the viscous solution is diluted with cold water prior to neutralization; but even after dilution and neutralization, the solution should be of substantial starch content, as hereinafter explained.

An alkalinized and neutralized starch solution prepared as hereinbefore described may be incorporated in any desired amount into papermaking stock in the beater engine and the stock then formed into paper, as ordinarily. If desired, precipitable paper sizes, such as those hereinbefore mentioned, may be added along with the starch solution and such precipitable sizes fixed to the stock as with alum or other suitable precipitant before the stock is delivered to the papermaking machine. Indeed, the most pronounced increase in the Mullen strength of paper is had when the alkalinized and neutralized starch solution is incorporated into the paper-making stock along with the usual precipitable paper sizes, such as those hereinbefore mentioned, which, when used by themselves, have the effect of decreasing sharply the Mullen strength of paper. Thus, for example, a waterleaf paper sheet of given basis weight has significantly greater Mullen strength than a paper sheet of the same basis weight containing, say, rosin size or rosin-wax size mixtures. However, when a surprisingly small proportion of alkalinized and neutralized starch, say, 1/16 to 1/4%, based on the dry weight of fiber, is incorporated along with such usual sizes into papermaking stock, it is possible to produce sized papers whose loss in Mullen strength on account of the presence therein of the usual sizes is in large measure offset or more than offset by the presence therein also of the alkalinized and neutralized starch.

In order to convey to those skilled in the art the value of using a starch pretreated in accordance with the present invention as a paper-sizing, it is well to compare in respect of Mullen strength paper containing such sizing and paper similarly made but containng raw starch or alkalinized but non-neutralized starch. Thus, when as little as 0.2% of starch, based on the weight of dry fiber, is used in alkalinized and neutralized condition, the paper has a Mullen strength 10% to to 40% greater than that of a similar unstarched paper, whereas, on the other hand, when the same amount of raw starch or alkalinized but non-neutralized starch was used, no such appreciable or significant increase in Mullen strength was noted in the paper.

In research for possible modifications of the herein disclosed practice, I found that in order to develop in paper the increased Mullen strength, as hereinbefore noted, neutralization of the alkalinized starch solution must be effected with the solution at substantial starch concentration that is, at a starch concentration in the order of magnitude of, say, 1/2% to 2%. Thus, after having formed alkalinized starch solutions, I have added them in non-neutralized condition to the papermaking stock or aqueous pulp suspension in the beater engine, thereby greatly diluting them by the enormous amount of water associated with the papermaking stock. This dilution may in practice be so great, when incorporating, say, 0.2% of starch based on the dry weight of fiber, that the starch solution in the beater engine may be of a concentration in the order of magnitude of as low as about 6 parts in 100,000 parts of water. Even though alum or other acid chemical may be added to the beater stock containing the highly diluted alkaninized starch solution in amount to effect neutralization, I found that neutralization of the starch solution at such high degree of dilution does not conduce to papers of significantly increased strength. In other words, the neutralization of the alkalinized starch solution must be effected while the solution is at substantial starch concentration.

It is, of course, possible to depart from the illustrative example hereinbefore given in various respects, for instance, in the amounts of material used, in the temperatures or other conditions under which they are mixed, etc., while still adhering to the principles of the present invention. Alkalies other than caustic soda may be used in alkalinizing the starch; and acid reagents other than sulphuric acid may be employed in neutralizing the alkalinized starch solution. In any event, however, the alkalinized and neutralized starch is used as prepared, that is, in the wet or solution form, since the properties sought to be realized from the starch are lost when the water of the solution is evaporated and the resulting starch solids are re-mixed with water. Aside from the fact that the recovery of substantially dry starch or starch solids from the solution is an expensive matter, the recovered starch cannot be re-dissolved in water to produce a starch solution whose desirable effects as a paper size are comparable to those of an alkalinized and neutralized starch solution used as prepared.

In securing the benefits of the present invention, it is not necessary to bring the alkalinized starch to a substantially neutral condition prior to its use as a paper-sizing even though the best results are had when the alkalinized starch is treated with an acid reagent until substantial neutrality has been reached therein. In the course of my work, I have observed that when an acid reagent, for instance, even such mildly acidic reagent as alum, is progressively added to the alkalinized starch solution, the Mullen strength of papers prepared from papermaking stocks into which the acid-treated starch solution is incorporated, progressively increases as the pH of the starch solution added to the papermaking stocks approaches the neutral zone. In producing the alkalinized starch solution hereinbefore specifically described, one may arrive at a starch solution having a pH value of about 13.0 or greater. When such starch solution has been brought by acid-treatment to a pH value of, say, about 10.0, papers into which the solution has entered as a size or binder already begin to display markedly improved pop-test, especially when rosin size or rosin-wax sizes have also entered thereinto. Upon reaching the neutral zone, say, a pH ranging from about 9.0 to 6.0, in the alkalinized starch solution, maximum Mullen strength is had in the starch-sized papers into which such a solution has entered, wherefore, it is preferable to carry the acid-treatment or neutralization of the alkalinized starch solution to such pH range, although one may overstep this range with only partial loss in reinforcing or strengthening effect. Thus, when this range is overstepped and the pH value of the starch solution is thereby brought to as low as, say, 3.0, one may still produce starch-treated papers whose pop-test is significantly higher than that of papers containing the same amount of untreated or merely alkalinized starch.

As already indicated, the alkalinized and neutralized starch solution is especially useful in the production of beater-sized papers, that is, papers that are sized through the introduction of the solution into the beater stock, but the alkalinized and neutralized starch solution may also be added at other stages of paper manufacture, for instance, at the Jordan, in the mixing chest, or at the head-box of the paper-making machine with substantially the same results.

I claim:—

1. In the production of starch-sized papers involving the incorporation of an aqueous starch composition into the paper, that practice, prior to incorporation of the composition into the paper, which comprises alkalinizing the composition to swell the starch granules therein and to form a gelatinous solution of high starch content, diluting the solution with water to a starch content not less than about 1/2%, and adding an acidic reagent in amount substantially to neutralize the solution while it is at a starch content not less than about 1/2%.

2. In the production of starch-sized papers involving the incorporation of an aqueous starch composition into the paper, that practice, prior to incorporation of the composition into the paper, which comprises alkalinizing the composition with caustic soda to swell the starch granules therein and to form a gelatinous solution of high starch content, diluting the solution with water to a starch content not less than about ½%, and adding sulphuric acid solution in amount substantially to neutralize the starch solution while it is at a starch content not less than about ½%.

3. In the production of starch-sized papers involving the incorporation of an aqueous starch composition into the paper, that practice prior to incorporation of the composition into the paper, which comprises alkalinizing the aqueous starch composition to swell the starch granules therein and to form a gelatinous solution of high starch content, diluting the starch solution with water to a starch content of not less than about ½%, and neutralizing alkalinity therein at least in part while keeping its starch content at not less than about ½%.

4. In the production of starch-sized papers involving the incorporation of an aqueous starch composition into the paper, that practice, prior to incorporation of the composition into the paper, which comprises alkalinizing the aqueous starch composition to swell the starch granules therein and to form a gelatinous solution of high starch content, diluting the starch solution with water to a starch content not less than about ½%, and neutralizing alkalinity therein to bring its pH value within a range of about 9.0 to 6.0 while keeping its starch content at not less than about ½%.

5. In the production of starch-sized papers which involves the incorporation of an aqueous starch composition into the papermaking stock and forming paper from the stock, that practice which comprises alkalinizing the aqueous starch composition to swell the starch granules therein and to form a gelatinous solution of high starch content, diluting the starch solution with water to a starch content not less than about ½%, neutralizing alkalinity therein while keeping its starch content at not less than about ½%, adding the resulting starch solution to the papermaking stock, and forming paper from the stock.

6. In the production of starch-sized papers which involves the incorporation of an aqueous starch composition into the papermaking stock and forming paper from the stock, that practice which comprises alkalinizing the aqueous starch composition to swell the starch granules therein and to form a gelatinous solution of high starch content, diluting the starch solution with water to a starch content not less than about ½%, neutralizing alkalinity therein while keeping its starch content at not less than about ½%, adding the resulting starch solution along with precipitable sizing ingredients to the papermaking stock, precipitating such precipitable sizing ingredients in the stock, and forming paper from the stock.

7. A paper product produced from a papermaking furnish containing starch and at least one other sizing ingredient, said product having been produced by the processing of its furnish substantially in accordance with the steps set forth in claim 6 and said product having higher Mullen strength than when its furnish is processed otherwise than in accordance with the steps set forth in claim 6.

OSCAR F. NEITZKE.